US009146911B1

(12) United States Patent
Shubina et al.

(10) Patent No.: US 9,146,911 B1
(45) Date of Patent: *Sep. 29, 2015

(54) PREDICTING EXPANSION DIRECTIONS FOR EXPANDABLE CONTENT ITEM ENVIRONMENTS

(75) Inventors: Ksenia Shubina, Vaughan (CA); Pavel Kobyakov, Waterloo (CA)

(73) Assignee: Google Inc., Mountain View, CA (US)

(*) Notice: Subject to any disclaimer, the term of this patent is extended or adjusted under 35 U.S.C. 154(b) by 500 days.

This patent is subject to a terminal disclaimer.

(21) Appl. No.: 13/551,120

(22) Filed: Jul. 17, 2012

(51) Int. Cl.
*G06F 7/00* (2006.01)
*G06F 17/22* (2006.01)

(52) U.S. Cl.
CPC ................... *G06F 17/2247* (2013.01)

(58) Field of Classification Search
CPC .......................................................... G06F 7/00
USPC .......... 719/311, 312, 313, 328; 715/715, 972, 715/244–247
See application file for complete search history.

(56) References Cited

U.S. PATENT DOCUMENTS

| | | | |
|---|---|---|---|
| 6,115,690 A | 9/2000 | Wong | |
| 6,615,251 B1 | 9/2003 | Klug | |
| 6,662,230 B1 | 12/2003 | Eichstaedt et al. | |
| 6,725,287 B1 | 4/2004 | Loeb et al. | |
| 6,973,436 B1 | 12/2005 | Shkedi | |
| 7,028,071 B1 | 4/2006 | Slik | |
| 7,124,129 B2 | 10/2006 | Bowman et al. | |
| 7,610,560 B2 | 10/2009 | Horvitz et al. | |
| 7,746,343 B1 | 6/2010 | Charaniya et al. | |
| 7,853,492 B1 | 12/2010 | Kirklin et al. | |
| 7,941,484 B2 | 5/2011 | Chandler et al. | |
| 7,949,702 B2 | 5/2011 | McGee et al. | |
| 7,979,382 B2 | 7/2011 | Guyan et al. | |
| 8,160,985 B2 | 4/2012 | Hino | |
| 8,237,937 B2 | 8/2012 | Sugiyama | |
| 8,350,849 B1 | 1/2013 | Jones et al. | |
| 8,352,539 B2 | 1/2013 | Mizuno | |
| 8,462,949 B2 | 6/2013 | Anderson et al. | |
| 8,510,167 B2 * | 8/2013 | Lisbakken ................. | 705/14.71 |
| 8,578,057 B2 | 11/2013 | Omar | |
| 8,606,723 B2 | 12/2013 | Seubert et al. | |
| 8,694,632 B1 | 4/2014 | Shubina et al. | |
| 8,751,304 B1 | 6/2014 | Kobyakov et al. | |
| 2002/0042786 A1 | 4/2002 | Scarborough | |
| 2002/0046199 A1 | 4/2002 | Scarborough | |
| 2002/0152305 A1 | 10/2002 | Jackson | |

(Continued)

FOREIGN PATENT DOCUMENTS

WO    WO0019332 A9    10/2001

OTHER PUBLICATIONS

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

(Continued)

*Primary Examiner* — Cesar Paula
*Assistant Examiner* — Jian Huang
(74) *Attorney, Agent, or Firm* — Fish & Richardson P.C.

(57) ABSTRACT

This specification describes methods, systems, and apparatus, including computer programs encoded on a computer-readable storage device, for determining expansion directions of content item environments that are used to display expandable content items.

20 Claims, 5 Drawing Sheets

(56) References Cited

U.S. PATENT DOCUMENTS

| | | |
|---|---|---|
| 2002/0169803 A1 | 11/2002 | Sampath et al. |
| 2003/0137512 A1 | 7/2003 | Hoehn et al. |
| 2003/0182310 A1 | 9/2003 | Charnock et al. |
| 2003/0182394 A1 | 9/2003 | Ryngler et al. |
| 2004/0193388 A1 | 9/2004 | Outhred et al. |
| 2004/0205711 A1 | 10/2004 | Ishimitsu et al. |
| 2006/0074730 A1 | 4/2006 | Shukla et al. |
| 2007/0150387 A1 | 6/2007 | Seubert et al. |
| 2007/0299857 A1 | 12/2007 | Gwozdz et al. |
| 2008/0288342 A1* | 11/2008 | Ingleshwar ............. 705/14 |
| 2009/0040246 A1 | 2/2009 | Miyasaka |
| 2009/0099901 A1* | 4/2009 | Sah et al. ............... 705/10 |
| 2009/0187583 A1 | 7/2009 | Pape et al. |
| 2009/0299862 A1 | 12/2009 | Fan et al. |
| 2010/0082657 A1 | 4/2010 | Paparizos et al. |
| 2010/0306249 A1 | 12/2010 | Hill et al. |
| 2010/0313129 A1 | 12/2010 | Hyman |
| 2011/0055685 A1 | 3/2011 | Jaquish et al. |
| 2011/0071818 A1 | 3/2011 | Jiang |
| 2011/0153435 A1 | 6/2011 | Pisaris-Henderson |
| 2011/0161990 A1* | 6/2011 | Smith et al. ............ 719/328 |
| 2012/0101907 A1 | 4/2012 | Dodda |
| 2013/0238994 A1 | 9/2013 | Yurasits |
| 2013/0275901 A1 | 10/2013 | Saas et al. |
| 2013/0339896 A1 | 12/2013 | Shadle et al. |
| 2014/0164923 A1 | 6/2014 | Georgiev et al. |
| 2014/0164985 A1 | 6/2014 | Pimmel et al. |
| 2014/0240293 A1 | 8/2014 | McCaughan et al. |

OTHER PUBLICATIONS

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.

"Peters, 'Iframe loading techniques and performance', aaronpeters.nl, Dec. 20, 2010, on line at aaronpeters.nl/blog/iframeloading-techniques-performance?%3E", 11 pages.

Gilbert, David, "Set IFRAME height based on size of remotely loaded content", solidgone Blog, Mar. 13, 2010, XP055066250, Retrieved from the Internet: URL:http://solidgone.org/Set-IFRAME-height-based-on-size-of-remotely-loaded-content [retrieved on Jun. 11, 2013], abstract, 10 pages.

* cited by examiner

PREDICTING EXPANSION DIRECTIONS FOR EXPANDABLE CONTENT ITEM ENVIRONMENTS

BACKGROUND

This specification relates to serving expandable content items for presentation in content item environments.

Sponsored content (e.g. advertisements, deals or special offers) can be provided over the Internet to various user devices. For example, a web page can include slots in which sponsored content can be presented. These slots can be defined in the web page or defined for presentation with a web page, for example, along with search results or other content. Sponsored content can also be delivered through dedicated web portals or applications executing on the user devices.

Some content items are expandable. For example, a content item can be initially presented in an unexpanded form as a 728×90 pixel graphical item. When an expansion event occurs, an expanded view of 728×270 pixels can be presented. The expanded view of the content item should fit inside the web page as rendered on the browser to present unwanted effects such as clipping.

Expandable content items may expand uni-directionally or multi-directionally. A uni-directional expandable content item can only expand in one direction, such as "down", "up", "left", or "right." A multi-directional expandable content item, on the other hand, can expand in two or more directions, e.g., either in an up or down direction, or in a left or right direction, as determined at advertising rendering time.

Because the content items are served for particular content item environments in a web page, a client device typically requests the content items when the page is being rendered at the client device. The content item management system that receives the request attempts to select, in response to the request, content items that can expand in a direction for which there is available space for expansion on the web page. For example, a content item environment at the top of a web page should not receive an expandable content item that expands only in the "up" direction; rather, it should receive an expandable content item that expands in the "down" direction (or, alternatively, in one or more of the "down", "right" and "left" directions, if there is space available for expansion in the "right" and "left" directions as well).

Content item serving systems use various models to determine the expansion directions available for a request. The models are typically resource specific. Resource specific models are based on observed expansions and/or calculated expansion directions of an expandable content item environment for a particular resource. For example, for a resource with three content item environments, reporting data may be received from a user device executing reporting instructions. The reporting data are used to determine expansion directions for each content item environment in the resource. The reporting data are stored by a server system that creates a model that predicts an expansion direction for each content item environment in the resource. The model is then consulted for content item requests that are received to determine expansion directions for incoming requests. While these models work well for observed resource and content item environment combinations, expansion directions for new resource and content item environment combinations cannot be predicted, as there are no data available (or insufficient data available) for these new combinations.

SUMMARY

In general, one aspect of the subject matter described in this specification can be embodied in methods that include the actions of actions of receiving expandable content item requests for publishers, each request specifying a publisher resource address of a publisher resource and a content item environment in the resource, the publisher resource address defined by a resource path that includes a domain name of the publisher; for each content item request, providing request data for a prediction specifying an expansion direction for the content item environment based on position data for the resource and the content item environment, the request data specifying the publisher resource address of the resource and the content item environment in the resource; for each prediction for which a successful prediction of a predicted expansion direction occurs, selecting an expandable content item having an expansion direction that is consistent with the predicted expansion direction; for each prediction for which a successful prediction does not occur: determining, from position data from a plurality of other resources each having a resource path that includes the domain name of the publisher, a prediction specifying an expansion direction for the content item environment, and selecting an expandable content item having an expansion direction that is consistent with the predicted expansion direction; and for each content item request, providing response data in response to the content item request that causes the selected expandable content item to be provided for the content item environment. Other embodiments of this aspect include corresponding systems, apparatus, and computer program products.

Particular embodiments of the subject matter described in this specification can be implemented so as to realize one or more of the following advantages. The process allows for determining expansion directions for content item environment and resource combinations that do not have sufficient data recorded. Therefore, in such cases a content item environment is more likely to be paired with an expandable content item that has an expansion direction suitable for the layout of the resource in which the content item environment is rendered. As data are collected for each new content item environment and resource combination, the accuracy of the model increases, and the system can automatically transition from path specific or site specific models to a resource specific for the resource. The resource specific model may also be used to augment path specific and/or site specific models that are used for new resource and content item environment combinations, or for existing resource and content item environment combinations for which model accuracy has degraded.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

This specification describes a process for predicting expansion directions for expandable content item environments. A user device rendering a publisher page transmits a content item request to a content item management system. The request includes, for each content item environment, a content item environment identifier that identifies the content item environment, and an address of the resource. The address data may be the resource URL, which includes the domain and host name of a computer device hosting the resource, a path, and the name of the resource.

In some implementations, the content item management system queries an expansion prediction subsystem for expansion directions. The query includes the content item environment identifier (e.g., a slot number, for example) for each content item environment, and the address of the resource. Each content item environment identifier and address of the resource constitutes a content item environment and resource pair. The model is trained based on observed position data for each content item environment and resource pair. For each content item environment, if the model returns a successful prediction of expansion directions for the content item environment, the content item management system uses the returned directions to filter expandable content items to identify expandable content items that are eligible for selection for the particular content item environment.

If, however, the model does not return a successful prediction (e.g., a null prediction value or, alternatively, returns a predicted expansion direction with a confidence measure that does not meet a threshold) for a particular content item environment and resource pair, then the content item management system predicts one or more expansion directions for the content item environment and resource pair from other content item environment and resource pairs for the same domain. The prediction may be based on position data for all resource and content item environment pairs for a particular domain that include the same content item environment identifier as specified in the query to the model. In another alternative, the prediction may be based on position data for all resource and content item environment pairs that include the same content item environment identifier as specified in the query to the model and for resources that share a common path identifier in addition to the same domain name. The content item management system then uses the predicted directions to filter expandable content items to identify expandable content items that are eligible for selection.

These features and additional features are described in more detail in the sections that follow.

Example Environment

Figure 1:
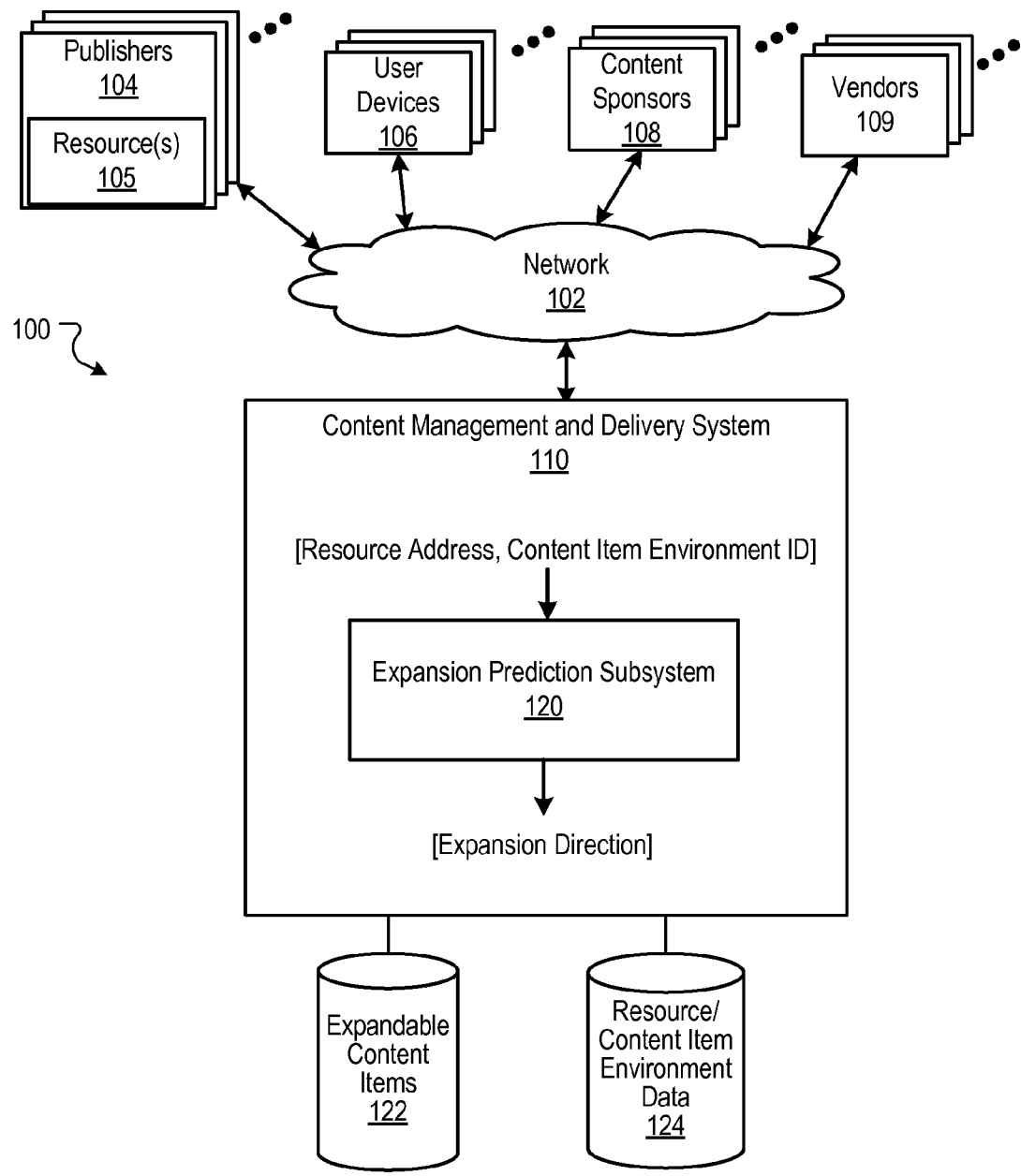
FIG. 1 is a block diagram of an example environment for delivering expandable content.

FIG. 1 is a block diagram of an example environment 100 for delivering content. The example environment 100 includes a content management and delivery system 110 for selecting and providing content to user devices. The example environment 100 includes a network 102, such as wide area network (WAN), the Internet, or a combination thereof. The network 102 connects publisher 104, user devices 106, content sponsors 108 (e.g., advertisers that use vendors to serve advertisements), vendors 109, and the content management and delivery system 110. The example environment 100 may include many thousands of publishers 104, user devices 106, content sponsors 108.

In some implementations, the content management and delivery system 110 includes a request handler that can receive a request for content from a user device, identify one or more content items (which may include one or more expandable content items 124), and provide a content item responsive to the request.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as scripts). In some implementations, the resources 105 can include sponsored content provided by the content sponsors 108 that can be rendered in specific locations in the resource. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource or a portion of a user display, such as a presentation location of a slot of a third-party content site or web page, in which content can be presented. These specified portions of the resource or user display are referred to as content item environments (e.g., content item slots, or, in the case of advertisement content items, advertisement slots).

When a resource 105 is requested by a user device 106 and the resource includes one or more content item environments, such as slots, in which a content item of a sponsor is to be rendered, the content management system 110 receives a request for one or content items to show in the slots. The request for the content item can include the content item environment identifier and the address of the resource.

The content management and delivery system 110 can select from the eligible content items that are to be provided to the user device 106 based at least in part, for example, on results of an auction. For expandable content items, the content management and delivery system 110 must first determine which expandable content items are eligible to participate in the auction. One eligibility factor is expansion direction. In particular, expandable content item that expand in particular directions should only be eligible for an auction if there is space available on the web page resource for the content item environment to expand in that particular direction. For example, a content item environment at the bottom of a resource should not be served an expandable content item that expands in the "down" direction. Selection of eligible content items from a set of expandable content items 122 is done by the expansion prediction subsystem 120, and is described in the sections that follow. From these eligible content items, one or more content items are selected for rendering in the content item environments. The selected content items are then provided user device for rendering in the respective content item environment slots.

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on the interest profiles for which they may be characterized.

Figure 2A:
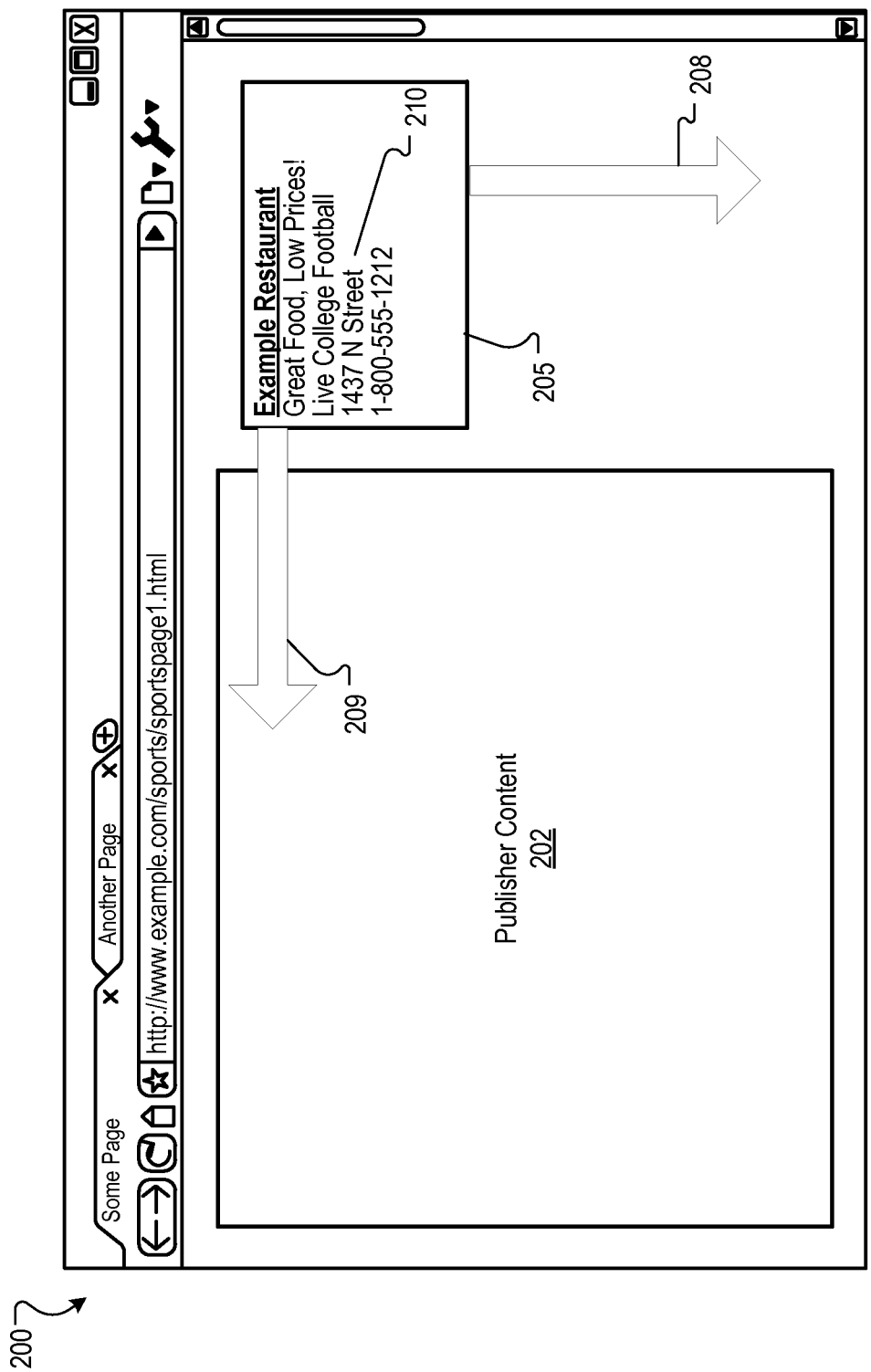
FIG. 2A depicts a browser displaying a sponsored expandable content item.

FIG. 2A shows an example user interface 200 in which content (such as sponsored content or requested content, or both) is provided to a user device 106. For example, the resource can include specific publisher content 202 that is authored by the publisher. Additionally, resource includes a content item slot 205 in which a content item from a third party can be rendered. The content management and delivery system 110 can provide the third-party content item (e.g., advertisements, etc.) from a pool of available content items.

In some implementations, the one or more content items 210 that are selected can be selected by conducting an auction. The content items that are eligible to participate in the auction can be selected by various targeting criteria, such as interest profiles, the relevance of content items to the publisher content 202, to a time of the day, geographical location, keywords, and expansion direction to name a few examples.

Figure 2B:
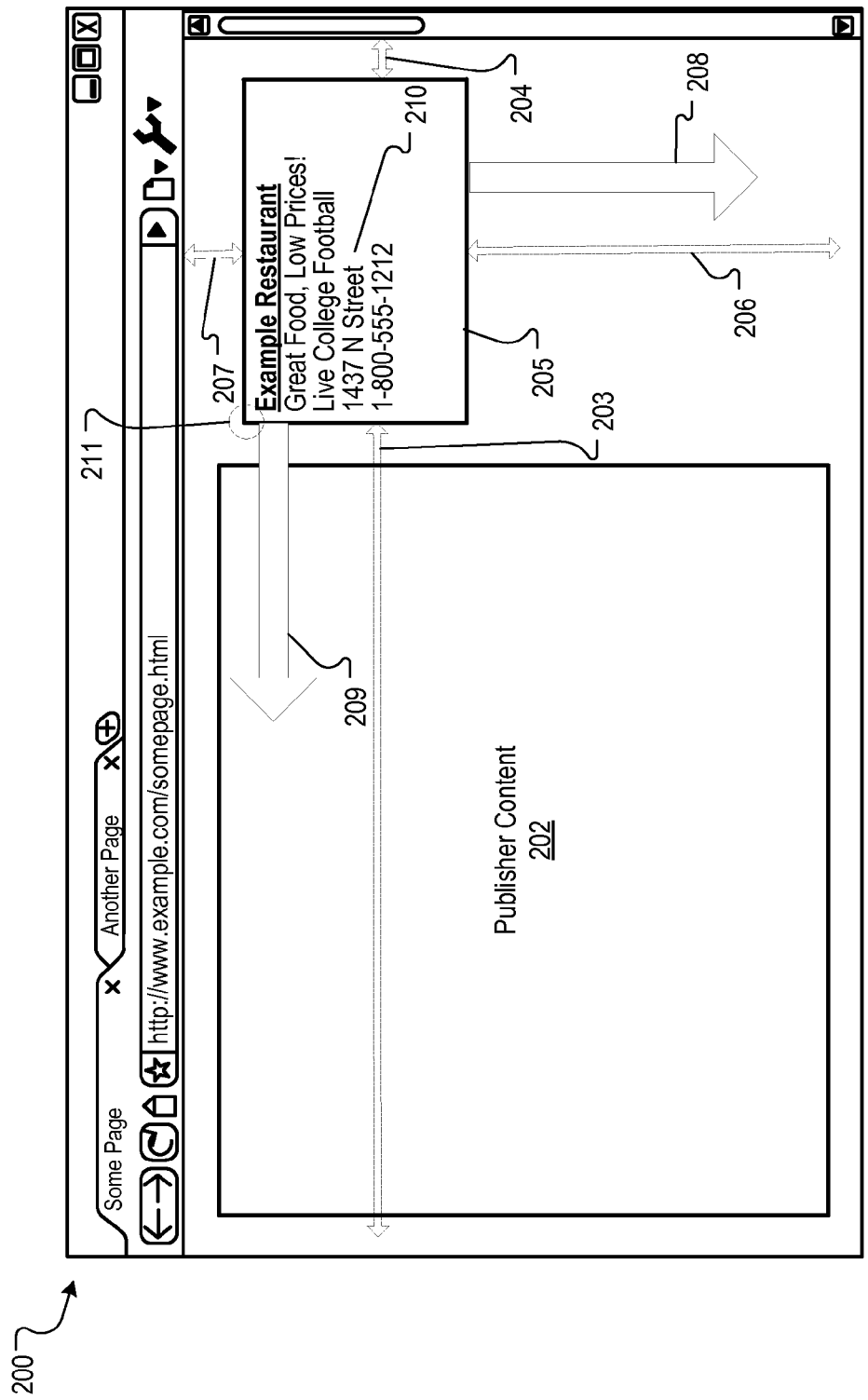
FIG. 2B depicts a browser displaying an expanded version of the sponsored expandable content item.

In the case of expandable content items, an unexpanded version of the content item is initially rendered in the content item slot 205. Depending on the expansion event for which the expandable content item is configured, the expandable content item may expand on the page load (or shortly after the page loads, such as after a timed delay), or in response to a user interaction, such as a mouse over or click. For example, an expanded version 215 of the content item 210 is shown in the example of FIG. 2B. In the example shown, the advertisement is expanded downward, however the advertisement may expand in other directions, such as the direction shown by phantom arrow 218.

The expanded version 215 displays additional information. The expanded version 215 can include additional content, for example, images, larger text, audio, video, or web-based content. In one example, the content item 210 is presented first as an advertisement in textual format while enabling the user to expand the advertisement into a menu-driven, graphical advertisement in the expanded version 215. The expanded content item 215 can also include a marker that the user can click or otherwise select such that the expanded content item 215 is replaced by the unexpanded content item 210.

Expansion Direction Modeling

The content management and delivery system 110 includes an expansion prediction subsystem 120 that predicts the expansion directions of content item environments. The prediction subsystem includes a model that predicts an expansion direction for the content item environment based on position data of the resource and the content item environment pair. The position data describes the location of the slots, and the dimensions of the resource in which the slots are rendered. The position data for each content item environment and resource pair are stored in the resource/content item environment data 124. The position data regarding the content item environment and resource are, in some implementations, provided subsequent to the request, e.g., after a content item has been provided to the user device for rendering in the content item environment. For example, a script running on the user device is configured to report the position data to the expansion prediction system after the resource has been rendered.

Example position data may include the content item environment dimensions, the location of the content item environment in a viewport or page, and the dimensions of the viewport or page. Other appropriate position data may also be used.

With reference again to FIG. 2A, there are two possible expansion directions available for the content item slot 205, given the relative position of the slot 205 in the user interface 200. In particular, the slot 205 may expand in a "down" direction 208, or in a "left" direction 209.

In the example of FIG. 2A, assume that the slot has the following dimensions: a width of 128 units, and a height of 80 units. Assume also that the border values are the borders defined by the web page, which are defined by a width of 456 units, and a height of 240 units. Alternatively, the borders of the viewport, which in FIG. 2A encompass a slightly larger area than the borders of the web page, could instead be used. Finally, assume that the slot position, as measured from a slot origin of the upper left corner of the slot, as indicted by the phantom circle 211 in FIG. 2B, is at an offset of 312 units in the x-direction and 24 units in the y-direction. These values are included in the position data.

The position data described with reference to FIG. 2A is for one instance of the resource being rendered on a user device. Depending on a variety of factors, the position data may not always be the same for each content item environment and resource pair. For example, a particular content item environment identifier may reference a content item environment in a first location for a first instance of the resource, and may reference a content item environment in a second location for a second instance of the resource. The difference may be due to a change in the resource by the publisher, for example, or may be due to inaccurate position data being reported, or may be due to different browser sizes and page layouts for different users.

From this position data, the content management system 110, determines eligible expansion directions. An eligible expansion direction is a direction for which there is enough display area to display an expansion of an expandable content item. The expansion direction is dependent on the distance separating a border of the content item environment and a border of the web page or view port. For example, in FIG. 2A, the distances 203, 204, 206 and 207 are, respectively, 312, i.e., ABS(312−0); 24 (ABS(0−24)); 136 (ABS(240−(24+80); and 64, ABS(456−(312+80)).

In some implementations, an eligible expansion direction for a particular direction is determined if the distance in the direction from the content item environment border to the parallel border of the web page or viewport without an intervening content item environment border meets a threshold distance. For example, the threshold distance may be 100 display units. Thus, in FIG. 2A, the expansion directions of "down" and "left" are eligible expansion directions, as the respective distances between borders are 136 and 312. The directions of "right" and "up" are not eligible, as the respective distances are 24 and 64.

In variations of these implementations, expansion directions are further subject to the requirement that an expansion will not occlude publisher content. For example, in FIG. 2A, the expansion direction 209 would not be selected, as expanding to the left would occlude the publisher content 202. For example, location data describing the area of display is generated (e.g., x- and y-coordinates of the display area for the content 202), and compared to estimated expansion dimensions of the expandable content item environment. For example, if the slot 205 were to expand 100 units to the left, the x-coordinate of the left most border of the slot would be at 212 display units (i.e., 312−100). As the x-coordinate of the right most border of the content display area for the content 202 is approximately 296, which is greater than 212, and the y-coordinates of the slot 205 are within the upper and lower y-coordinates of the area in which the content 202 is displayed, the process would determine that the expanded content item environment would occlude the display of the content 202. Accordingly, the "left" direction is not determined to be an expansion direction.

Once an expansion direction is determined, the expansion direction for the particular instance of the content item environment and resource are saved in the resource/content item environment data 124. As position data are reported for each instance of the resource, the expansion prediction system 120 builds a model for the content item environment and resource pair. Thus, each different resource will have expansions determined from respective sets of position data.

Thereafter, in response to a request for a content item, the model is queried with the content item environment identifier and the address of the resource. In, response to the query, the model returns a predicted expansion direction.

To illustrate, assume there are 1,000 expansion direction determinations for content item environment "1" on www.example.com/sports/sportspage1.html. Of those 1,000 expansion direction determinations, 900 are "Up", and 100 are "Left." Also assume that for content item environment "1" on www.example.com/news/newspage1.html, there are 2,000 expansion direction determinations—1,850 are "Up" and 150 are "Left." From these determinations, the model selects the most frequent expansion direction for a particular content item environment and resource combination, and uses a ratio of the number of predictions in the expansion direction to the total number of predictions as an accuracy measure. For example, for content item environment "1" on the resource addressed at www.example.com/sports/sportspage1.html, the model will generate the prediction "Up" with an accuracy of 90%. Likewise, for the content item environment "1" on resources addressed at www.example.com/news/newspage1.html, the model will generate the prediction of "Up" with an accuracy of 92.5%.

Address Clustering to Predict Expansion Directions

The model described above works well for content item environment and resource pairs for which sufficient position data have been received to build model. However, if a query for a content item environment and resource pair for which there is little or no reporting data is sent to the model, the model may not successfully predict an expansion direction. This is because position data may not be available for every content item environment and resource pair, or that the data may not indicate a particular expansion direction with a desired confidence level. In either situation, the response from the expansion prediction subsystem 120 is considered to be an unsuccessful response.

For example, suppose a request for a new content item environment and resource address pair is received for content item environment "1" and the resource addressed at www.example.com/news/newspage2.htm is received. As there are no prior reporting data for this content item environment and resource address pair, there is no prediction available.

Thus, to augment the prediction process, the expansion prediction subsystem 120 processes resource measurements for a particular content item environment and particular resource across other resources hosted by a host with the same domain name as included in the address of the particular resource. The underlying rationale is that resources on the same domain or the same host are likely to follow the same template, and thus the expansion prediction subsystem 120 can predict expansion directions from data for previously process content item environment and resource address pairs and apply the predictions to the new one.

In some implementations, the model includes two layers. The first layer is as describe above and includes predictions for observed content item environment and resource address pairs. The second layer includes predictions clustered by domain and paths of resources. For an incoming request, the model is queried with the content item environment and resource address pair. If a successful prediction is not returned, then the model generates a prediction according to the clustered predictions.

To illustrate, for the content item environment "1" and the resource addressed at www.example.com/news/newspage2.html, a successful prediction is not returned. Accordingly, the predictions for content item environment "1" on the resource addressed at www.example.com/sports/sportspage1.html and for content item environment "1" on the resource addressed at www.example.com/news/newspage1.html are clustered to generate 2,750 "Up" determinations and 250 "Left" determinations. Accordingly, the expansion prediction is "Up", with an estimated accuracy of 91.67%.

Figure 3:
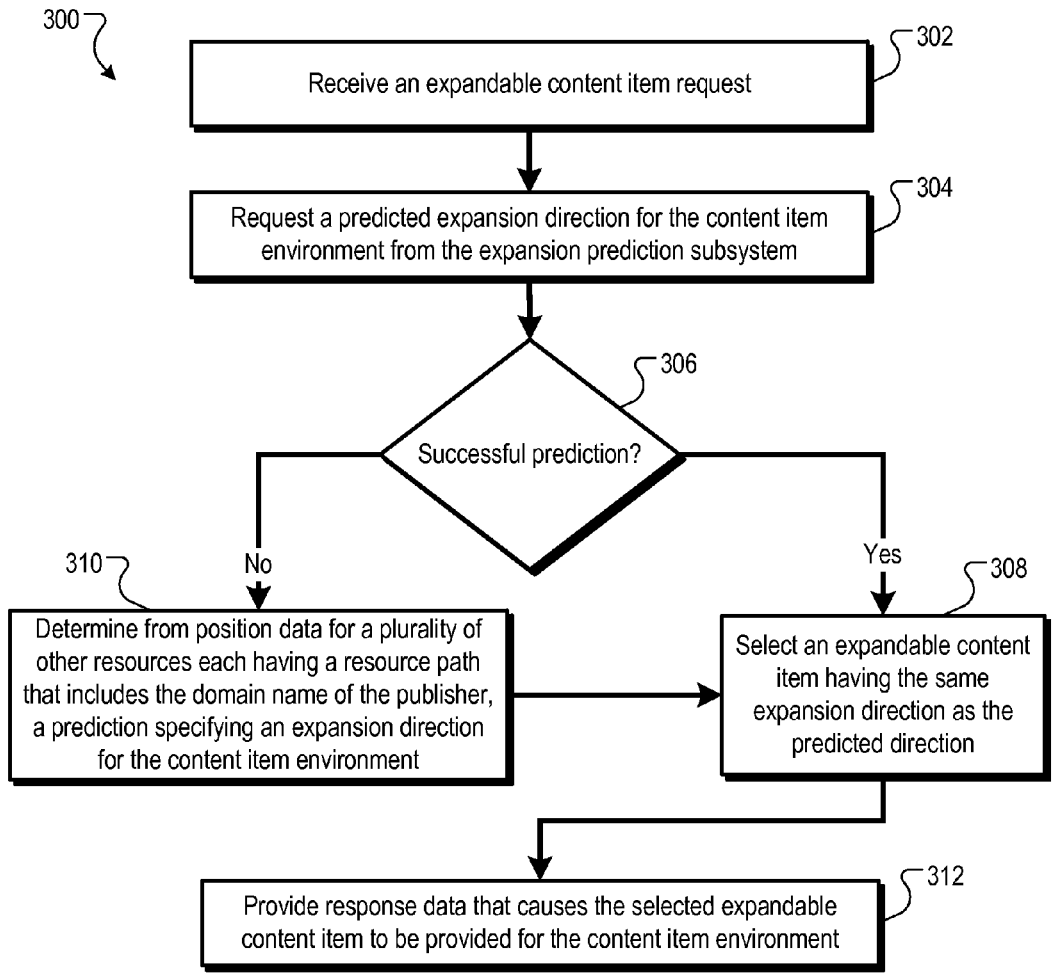
FIG. 3 is a flow diagram of an example process for selecting an expandable content item for placement in a content item environment.

FIG. 3 is a flow diagram of an example process 300 for selecting an expandable content item for placement in a content item environment. The process 300 can be implemented in a data processing apparatus of one or more computers in the content management and delivery system.

The process 300 receives a request for an expandable content item (302). The request is generated, for example, by a user device that is rendering a resource that includes an expandable content item environment. The request includes data specifying a publisher resource address of a publisher resource and a content item environment in the resource. The publisher resource address is defined by a resource path that includes a domain name of the publisher. For example, for the resource at the address www.example.com/sports/sportspage1.html, the domain name is example.com, and the path is www.example.com/sports.

The process 300 requests a predicted expansion direction for the expandable content item environment from the expansion prediction subsystem (304). For example, the content management and delivery system 110 may provide request data to an expansion prediction subsystem 120 for a prediction specifying an expansion direction for the content item environment. The prediction may be modeled from position data of the publisher and the content item environment.

The process 300 determines if a successful prediction is received in response to the request (306). For example, if the prediction subsystem 120 returns expansion directions, or returns expansion directions with a confidence measure that meets a threshold, then a successful prediction is received. Conversely, if no expansion directions are returned, or if the expansion directions that are returned do not have a confidence measure that meets the threshold, then a successful prediction does not occur.

If the process 300 determines a successful prediction is received, then the process 300 selects an expandable content item having the same expansion direction as the predicted direction (308). The successful prediction will provide one or more expansion directions. The content item management and delivery system 110 will select those expansion directions and use them to filter content items for delivery in response to the request. For example, assume the request is for content item environment "1" on www.example.com/news/newspage1.html, for which there are 2,000 expansion direction determinations—1,850 are "Up" and 150 are "Left"—a returned prediction will be "Up" with a confidence of 92.5%.

If the process 300 determines that a successful prediction is not received, then the process 300 determines, from position data from a plurality of other resources each having a resource path that includes the domain name of the publisher, a prediction specifying an expansion direction for the content item environment (310). For example, assume the request is for content item environment "1" in the resource addressed at www.example.com/news/newspage2.html. As there are no prior reporting data for this content item environment and resource address pair, there is no prediction available. Thus, a successful prediction is not received. Accordingly, the process 300 accesses a clustered prediction for content item environment "1" on the resource addressed at www.example.com/sports/sportspage1.html and for content item environment "1" on resources addressed at www.example.com/news/newspage1.html. Because the clustered prediction generates 2,750 "Up" determinations and 250 "Left" determinations, the expansion prediction that is determined is "Up", with an estimated accuracy of 91.67%.

The process 300 selects an expandable content item having the same expansion direction as the predicted direction (308), and then provides response data that causes the expandable content item to be provided for the content item environment (312). For example, the selected content items, which include expandable content items that expand in either the computed expansion directions or the predicted directions, are submitted to an auction process (or some other selection process). One or more content items are then selected as being responsive to the request, and the content item management and delivery system 110 provides the content items to the requesting user device.

In the example process above, content management and delivery system 110 aggregates predictions at the domain level. In other words, each of the other resources for which directions are observed and that are used to predict the directions of the content item environment and resource pair need only have resource path that includes the domain name of the publisher. The remainder of the path is not used in selected the resource and content item environment pair. In other implementations, however, each of the other resources for which directions are observed and that are used to predict the directions of the content item environment and resource pair must have the same resource path, or common portions of a resource path that also include the domain name of the publisher.

To illustrate, assume that the following resources with a particular content item environment are served by a publisher:

TABLE 1

| Resources with Content Item Environment "1" | Up | Down | Left | Right |
| --- | --- | --- | --- | --- |
| www.example.com/sports/bb/sportspage1.html | 30 | 140 | 0 | 0 |
| www.exmaple.com/sports/fb/sportspage1.html | 20 | 80 | 0 | 0 |
| www.example.com/news/world/newspage1.html | 1700 | 100 | 0 | 0 |
| www.example.com/news/world/newspage2.html | 1500 | 70 | 0 | 0 |
| www.example.com/news/national/newspage1.html | 1000 | 60 | 0 | 0 |
| www.example.com/news/national/newspage2.html | 1 | 1 | 0 | 0 |

Assume that a particular implementation requires that each of the other resources for which directions are observed and that are used to predict the directions of the content item environment and resource pair need only have resource path that includes the domain name of the publisher. For the resource and content item environment pair of www.example.com/news/national/newspage2.html, which has only two observations, a successful prediction will not be returned, as there is not enough data to produce a successful prediction. Accordingly, the expansion directions for all resources at the domain example.com for content item environment "1" are summed, resulting in the following values: Up: 4251; Down: 451; Left: 0; Right: 0. Accordingly, the direction of "Up" is selected, with an accuracy of 90.4%.

Now assume that each of the other resources for which directions are observed and that are used to predict the directions of the content item environment and resource pair must have the same resource path. In this implementation, on the data for the resource www.example.com/news/national/newspage1.html will be used, because only that resource has the same path—www.example.com/news/national/. Here, the direction of "Up" would be selected, with an accuracy of 94.3%.

In yet another implementation in which each of the other resources for which directions are observed and that are used to predict the directions of the content item environment and resource pair must have common portions of a resource path that also include the domain name of the publisher, the data for the "news" resources would be used. The resulting direction values are: Up: 4201; Down: 231; Left: 0; Right: 0. Thus, the direction of "Up" is selected, with an accuracy of 94.8%.

In additional implementations, data can be selected according to a selection hierarchy until a desired level of confidence is achieved. For example, only content item environment and resource pairs for resources addressed with the same path as specified in the query are selected first. If a desired confidence level is not achieved for the expansion prediction, then additional resources with a portion of the same path are selected. The hierarchal selection process continues, with each selection iteration requiring a less specific path until a desired confidence level is achieved, or until a root level (i.e., the domain name only) is reached. In the latter case, the root level prediction is used.

To determine a confidence level, a variety of appropriate statistical processes can be used. For example, a minimum number of measurements must be recorded (e.g., at least 100 total), or some other appropriate process to determine a confidence level can be used.

Expansion Direction Calculations

Figure 4A:
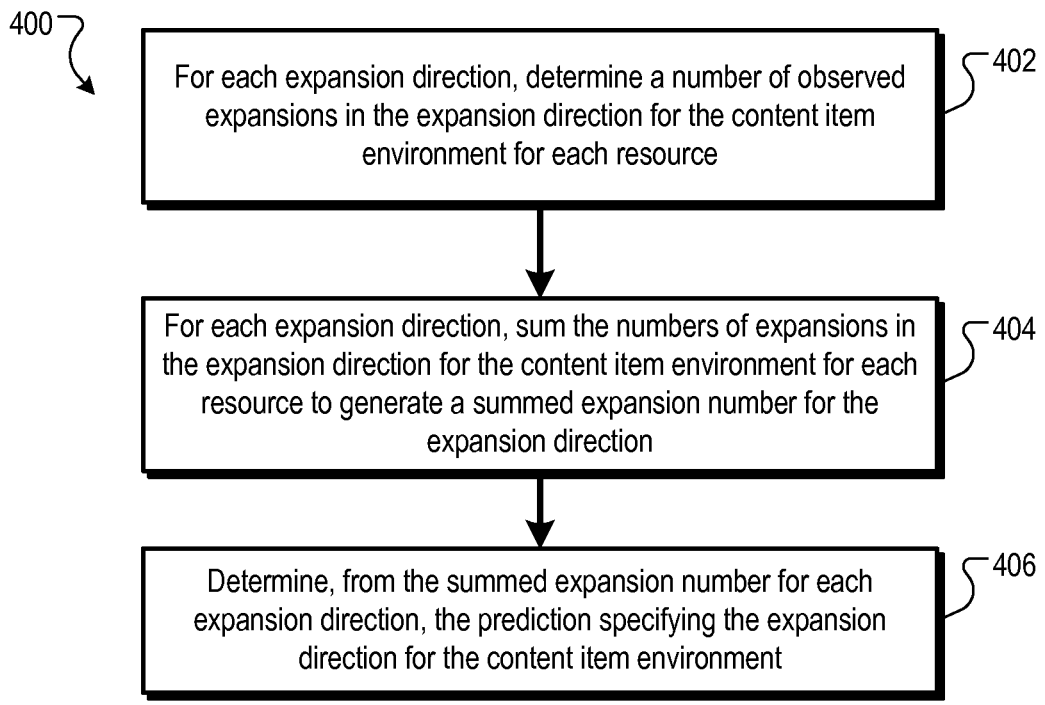
FIG. 4A is a flow diagram of an example process for predicting expansion directions for a content item environment.

There are a variety of appropriate processes that can be used to determine an expansion direction from expansion data for content item environment and resource pairs. The process described above is illustrated in FIG. 4A, which is a flow diagram of an example process 400 for predicting expansion directions for a content item environment. The process 400 can be implemented in a data processing apparatus of one or more computers in the content management and delivery system.

The process 400, for each expansion direction, determines a number of observed expansions in the expansion direction for the content item environment for each resource. For example, with respect to Table 1 above, the process 400 accesses the data indicative the Up, Down, Left and Right values.

The process 400, for each expansion direction, sums the numbers of expansions in the expansion direction for the content item environment for each resource to generate a summed expansion number for the expansion direction. For example, as described above, the Up, Down, Left and Right values are summed. The values can be selected based on the domain and path options described above.

The process 400, determines from the summed expansion number for each expansion direction the prediction specifying the expansion direction for the content item environment. For example, as described above, the value of "Up" is determined, as that value has the largest summed expansion number relative to other expansion directions.

Figure 4B:
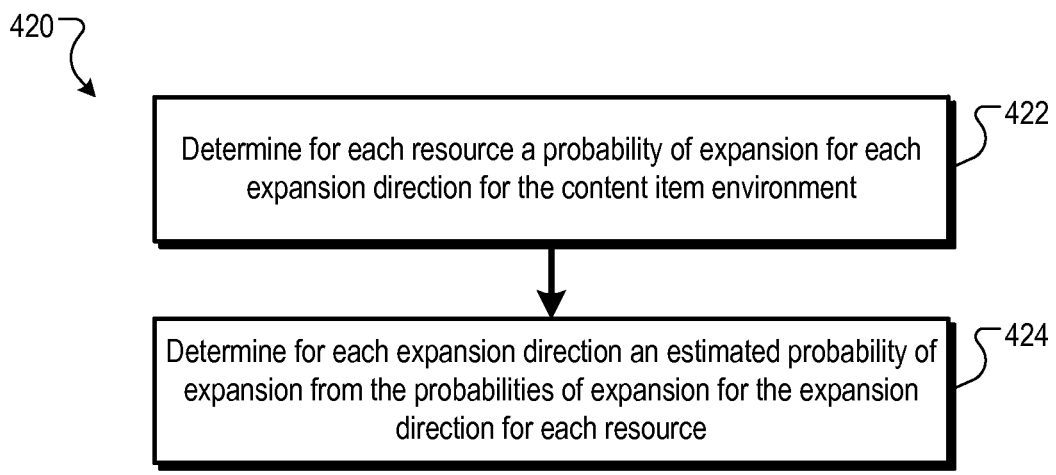
FIG. 4B is a flow diagram of another example process for predicting expansion directions for a content item environment.

FIG. 4B is a flow diagram of another example process 420 for predicting expansion directions for a content item environment. The process 420 first determines the expansion direction likelihoods for each resource, and then determines the expansion direction form the determined likelihoods. The process 420 can be implemented in a data processing apparatus of one or more computers in the content management and delivery system.

The process 420 determines for each resource a probability of expansion for each expansion direction for the content item environment (422). For example, with respect to Table 1 above, the following probabilities are determined:

Note that the predictions for the "newspage2.html" resource are "Null" values, as the data are too sparse to make a prediction with a desired confidence level.

The process 420 determines for each expansion direction an estimated probability of expansion from the probabilities of expansion for the expansion direction for each resource (424). For example, with respect to Table 2, assume all resources at the domain example.com and with the content item environment "1" are used to determine an expansion direction for content item environment "1" in the resources newspage2.html. The process 420 determines a central tendency, e.g., an average, of the expansion direction predictions: Up: 64.4%; Down: 35.6%; Left: 0%; Right: 0%. Accordingly, the expansion direction of "Up" is selected.

In variations of these implementations, a minimum expansion direction prediction likelihood is required to select an expansion direction. For example, a minimum likelihood of 90% is required before an expansion direction is selected. Thus, if the prediction does not meet the minimum likelihood, then an expansion direction may be selected by other means (e.g., based on dimensions reported in the content item request), or no expandable content item is selected and only a non-expanding content item is provided. Although a minimum likelihood of 90% is used, other thresholds that are higher or lower than 90% can also be used.

Additional Implementation Details

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a

TABLE 2

| Resources with Content Item Environment "1" | Up | Down | Left | Right |
|---|---|---|---|---|
| www.example.com/sports/bb/sportspage1.html | 17.6% | 82.4% | 0% | 0% |
| www.exmaple.com/sports/fb/sportspage1.html | 20% | 80% | 0% | 0% |
| www.example.com/news/world/newspage1.html | 94.4% | 5.6% | 0% | 0% |
| www.example.com/news/world/newspage2.html | 95.5% | 4.5% | 0% | 0% |
| www.example.com/news/national/newspage1.html | 94.3% | 5.7% | 0% | 0% |
| www.example.com/news/national/newspage2.html | Null | Null | Null | Null | database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A computer-implemented method, comprising:
receiving expandable content item requests for publishers, each request specifying a publisher resource address of a publisher resource and a content item environment in the resource, the publisher resource address defined by a resource path that includes a domain name of the publisher;

for each content item request, providing request data for a prediction specifying an expansion direction for the content item environment based on position data for the resource and the content item environment, the request data specifying the publisher resource address of the resource and the content item environment in the resource;

for each prediction for which a successful prediction of a predicted expansion direction occurs, selecting an expandable content item having an expansion direction that is consistent with the predicted expansion direction;

for each prediction for which a successful prediction does not occur:
  determining, from position data from a plurality of other resources each having a resource path that includes the domain name of the publisher, a prediction specifying an expansion direction for the content item environment; and
  selecting an expandable content item having an expansion direction that is consistent with the predicted expansion direction; and for each content item request, providing response data in response to the content item request that causes the selected expandable content item to be provided for the content item environment.

2. The method of claim 1, wherein:
each prediction specifying an expansion direction comprises, for each of a plurality of expansion directions, a probability of expansion in the expansion direction; and
determining from prediction data for the plurality of other resources each having a resource path that includes the domain name of the publisher the prediction specifying the expansion direction for the content item environment comprises:
  determining for each resource a probability of expansion for each expansion direction for the content item environment; and
  determining for each expansion direction an estimated probability of expansion from the probabilities of expansion for the expansion direction for each resource.

3. The method of claim 2, wherein determining for each expansion direction the estimated probability of expansion from the probabilities of expansion for the expansion direction for each resource comprises determining, for each expansion direction, a central tendency of the probabilities of expansion for the expansion direction.

4. The method of claim 1, wherein:
determining from position data for the plurality of other resources each having a resource path that includes the domain name of the publisher the prediction specifying the expansion direction for the content item environment comprises:
  for each of a plurality of expansion directions:
    determining a number of observed expansions in the expansion direction for the content item environment for each resource;
    summing the numbers of expansions in the expansion direction for the content item environment for each resource to generate a summed expansion number for the expansion direction; and
  determining, from the summed expansion number for each expansion direction, the prediction specifying the expansion direction for the content item environment.

5. The method of claim 4, wherein determining, from the summed expansion number for each expansion direction, the prediction specifying the expansion direction for the content item environment comprises selecting as a predicted expansion direction the expansion direction having a largest of the summed expansion numbers.

6. The method of claim 1, wherein determining, from position data from a plurality of other resources each having a resource path that includes the domain name of the publisher, a prediction specifying an expansion direction for the content item environment comprises determining the prediction specifying the expansion direction only when a corresponding prediction likelihood meets a minimum likelihood threshold.

7. The method of claim 1, wherein:
each of the other resources has a resource address that includes the domain name of the publisher, a path, and a resource name of resource, and wherein the path for each resource is the same.

8. The method of claim 1, wherein:
each of the other resources has a resource address that includes the domain name of the publisher, a path, and a resource name of resource, and wherein at least two paths are specified.

9. The method of claim 1, wherein the expandable content item is an expandable advertisement.

10. A system, comprising:
a data processing apparatus comprising on more processors; and
a non-transitory computer memory apparatus in data communication with the data processing apparatus and storing instructions executable by the data processing apparatus and that upon such execution cause the data processing apparatus to perform operations comprising:
receiving expandable content item requests for publishers, each request specifying a publisher resource address of a publisher resource and a content item environment in the resource, the publisher resource address defined by a resource path that includes a domain name of the publisher;

for each content item request, providing request data for a prediction specifying an expansion direction for the content item environment based on position data for the resource and the content item environment, the request data specifying the publisher resource address of the resource and the content item environment in the resource;

for each prediction for which a successful prediction of a predicted expansion direction occurs, selecting an expandable content item having an expansion direction that is consistent with the predicted expansion direction;

for each prediction for which a successful prediction does not occur:
  determining, from position data from a plurality of other resources each having a resource path that includes the domain name of the publisher, a prediction specifying an expansion direction for the content item environment; and
  selecting an expandable content item having an expansion direction that is consistent with the predicted expansion direction; and for each content item request, providing response data in response to the content item request that causes the selected expandable content item to be provided for the content item environment.

11. The system of claim 10, wherein:
each prediction specifying an expansion direction comprises, for each of a plurality of expansion directions, a probability of expansion in the expansion direction; and
determining from prediction data for the plurality of other resources each having a resource path that includes the domain name of the publisher the prediction specifying the expansion direction for the content item environment comprises:
   determining for each resource a probability of expansion for each expansion direction for the content item environment; and
   determining for each expansion direction an estimated probability of expansion from the probabilities of expansion for the expansion direction for each resource.

12. The system of claim 11, wherein determining for each expansion direction the estimated probability of expansion from the probabilities of expansion for the expansion direction for each resource comprises determining, for each expansion direction, a central tendency of the probabilities of expansion for the expansion direction.

13. The system of claim 10, wherein:
determining from position data for the plurality of other resources each having a resource path that includes the domain name of the publisher the prediction specifying the expansion direction for the content item environment comprises:
   for each of a plurality of expansion directions:
      determining a number of observed expansions in the expansion direction for the content item environment for each resource;
      summing the numbers of expansions in the expansion direction for the content item environment for each resource to generate a summed expansion number for the expansion direction; and
      determining, from the summed expansion number for each expansion direction, the prediction specifying the expansion direction for the content item environment.

14. The system of claim 13, wherein determining, from the summed expansion number for each expansion direction, the prediction specifying the expansion direction for the content item environment comprises selecting as a predicted expansion direction the expansion direction having a largest of the summed expansion numbers.

15. The system of claim 10, wherein determining, from position data from a plurality of other resources each having a resource path that includes the domain name of the publisher, a prediction specifying an expansion direction for the content item environment comprises determining the prediction specifying the expansion direction only when a corresponding prediction likelihood meets a minimum likelihood threshold.

16. The system of claim 10, wherein:
each of the other resources has a resource address that includes the domain name of the publisher, a path, and a resource name of resource, and wherein the path for each resource is the same.

17. The system of claim 10, wherein:
each of the other resources has a resource address that includes the domain name of the publisher, a path, and a resource name of resource, and wherein at least two paths are specified.

18. The system of claim 10, wherein the expandable content item is an expandable advertisement.

19. A computer memory apparatus storing instructions executable by a data processing apparatus and that upon such execution cause the data processing apparatus to perform operations comprising:
receiving expandable content item requests for publishers, each request specifying a publisher resource address of a publisher resource and a content item environment in the resource, the publisher resource address defined by a resource path that includes a domain name of the publisher;
for each content item request, providing request data for a prediction specifying an expansion direction for the content item environment based on position data for the resource and the content item environment, the request data specifying the publisher resource address of the resource and the content item environment in the resource;
for each prediction for which a successful prediction of a predicted expansion direction occurs, selecting an expandable content item having an expansion direction that is consistent with the predicted expansion direction;
for each prediction for which a successful prediction does not occur:
   determining, from position data from a plurality of other resources each having a resource path that includes the domain name of the publisher, a prediction specifying an expansion direction for the content item environment; and
   selecting an expandable content item having an expansion direction that is consistent with the predicted expansion direction; and
for each content item request, providing response data in response to the content item request that causes the selected expandable content item to be provided for the content item environment.

20. The computer memory apparatus of claim 19, wherein:
each prediction specifying an expansion direction comprises, for each of a plurality of expansion directions, a probability of expansion in the expansion direction; and
determining from prediction data for the plurality of other resources each having a resource path that includes the domain name of the publisher the prediction specifying the expansion direction for the content item environment comprises:
   determining for each resource a probability of expansion for each expansion direction for the content item environment; and
   determining for each expansion direction an estimated probability of expansion from the probabilities of expansion for the expansion direction for each resource.

* * * * *